(12) United States Patent
Chen

(10) Patent No.: US 12,370,609 B1
(45) Date of Patent: Jul. 29, 2025

(54) TOOL HOLDER ASSEMBLY EASY TO ASSEMBLE AND DISASSEMBLE

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/741,733

(22) Filed: Jun. 12, 2024

(51) Int. Cl.
  *B23B 31/02* (2006.01)
  *B23B 31/00* (2006.01)
  *B23B 31/26* (2006.01)

(52) U.S. Cl.
  CPC .......... *B23B 31/261* (2013.01); *B23B 31/006* (2013.01); *B23B 2231/04* (2013.01); *B23B 2260/03* (2013.01); *Y10T 279/34* (2015.01); *Y10T 279/35* (2015.01); *Y10T 409/30952* (2015.01)

(58) Field of Classification Search
  CPC ..... Y10T 409/30952; Y10T 279/17299; Y10T 279/17504; B23B 31/006; B23B 31/2012
  USPC ..................... 409/234; 279/42, 48
  See application file for complete search history.

(56) References Cited

U.S. PATENT DOCUMENTS

| | | | | |
|---|---|---|---|---|
| 2,381,335 A | * | 8/1945 | Charles | B23B 31/20125 279/51 |
| 3,451,686 A | * | 6/1969 | Hammond | B23B 31/20125 279/51 |
| 4,817,972 A | * | 4/1989 | Kubo | B23B 31/202 279/42 |
| 7,549,953 B2 | * | 6/2009 | Walters | B23B 31/20125 279/42 |
| 9,387,542 B2 | * | 7/2016 | Gosselin | B23Q 3/12 |
| 10,814,447 B2 | * | 10/2020 | Gosselin | B23B 31/4073 |
| 2006/0197292 A1 | * | 9/2006 | Oshnock | B23B 31/20125 279/52 |
| 2019/0184471 A1 | * | 6/2019 | Chen | B23B 31/20125 |
| 2025/0153249 A1 | * | 5/2025 | Chen | B23B 31/1107 |

FOREIGN PATENT DOCUMENTS

| | | | |
|---|---|---|---|
| DE | 102014106328 A1 | * | 11/2015 |
| JP | 2002-059304 A | * | 2/2002 |
| JP | 2005-066758 A | * | 3/2005 |
| WO | WO-00/14502 A1 | * | 3/2000 |

* cited by examiner

*Primary Examiner* — Erica E Cadugan
(74) *Attorney, Agent, or Firm* — Apex Juris, pllc; Cera Oh

(57) ABSTRACT

A tool holder assembly easy to assemble and disassemble has a chuck and a clamping unit. The chuck has a base portion, a nut positioning portion, and an annular groove between the above two portions. An arc surface is formed on a periphery of the nut positioning portion by cutting. The clamping nut is hollow, surrounds an interior space, and has an inner protruding edge to form an eccentric circle in the interior space. A vertex of the arc surface defines a tangent line to further define a tangent circle and a shifting distance being substantially equal to an eccentric distance of the eccentric circle. When mounting the chuck through the clamping nut, the arc surface allows the inner protruding edge to pass by for not obstructing the nut positioning portion, which improves efficiency and convenience of assembly.

12 Claims, 12 Drawing Sheets

US 12,370,609 B1

TOOL HOLDER ASSEMBLY EASY TO ASSEMBLE AND DISASSEMBLE

BACKGROUND OF THE INVENTION

1. Field of the Invention

The present invention relates to a tool holder assembly, and particularly to a tool holder assembly easy to assemble and disassemble.

2. Description of Related Art

A conventional tool holder has a holder body, a chuck, and a clamping nut, wherein the clamping nut has an inner protruding edge to form an eccentric design on an interior of the clamping nut. When the clamping nut is unscrewed from the holder body, the inner protruding edge abuts against the chuck and thereby allows the chuck to be detached from the holder body at the same time, which improves convenience of disassembly of the conventional tool holder.

However, due to the inner protruding edge, for assembling the chuck and the clamping nut together, the chuck needs to avoid the inner protruding edge at a specific angle to be mounted through the clamping nut, which can be difficult in operation. Not only the angle of the chuck needs to be continuously adjusted during mounting, but also the chuck is prone to engaging with the inner protruding edge or other construction on an inner side of the clamping nut and needs to be plucked from the clamping nut before the chuck is successfully mounted through the clamping nut. The assembly of the conventional tool holder thus takes lots of time and effort, which is not cost-effective.

To overcome the shortcomings of the conventional tool holder mentioned above, the present invention provides a tool holder assembly easy to assemble and disassemble to mitigate or obviate the aforementioned problems.

SUMMARY OF THE INVENTION

The main objective of the present invention is to provide a tool holder assembly easy to assemble and disassemble that improves convenience and efficiency of assembling a chuck and a clamping nut.

The tool holder assembly easy to assemble and disassemble has a chuck and a clamping nut. The chuck has a base portion, a nut positioning portion, an annular groove, and at least one arc surface. The annular groove is recessed on a periphery of the chuck and has two opposite sides respectively connected to the base portion and the nut positioning portion. The at least one arc surface is formed on a periphery of the nut positioning portion by cutting. The clamping nut is hollow, surrounds an interior space, and has an inner protruding edge. The inner protruding edge is formed on an inner side of the clamping nut to form an eccentric circle having a center spaced from an axis of the clamping nut by an eccentric distance in the interior space. The nut positioning portion is configured to define a tangent line by a vertex of said arc surface so as to define a tangent circle, and the tangent circle is partially overlapped with the nut positioning portion, has a center spaced from a center of the nut positioning portion by a shifting distance being substantially equal to the eccentric distance, and has a radius being substantially equal to a radius of the nut positioning portion. When the chuck is mounted through the interior space, the inner protruding edge is configured to pass by said arc surface, enter the annular groove, be blocked by the nut positioning portion, and thereby be engaged in the annular groove.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
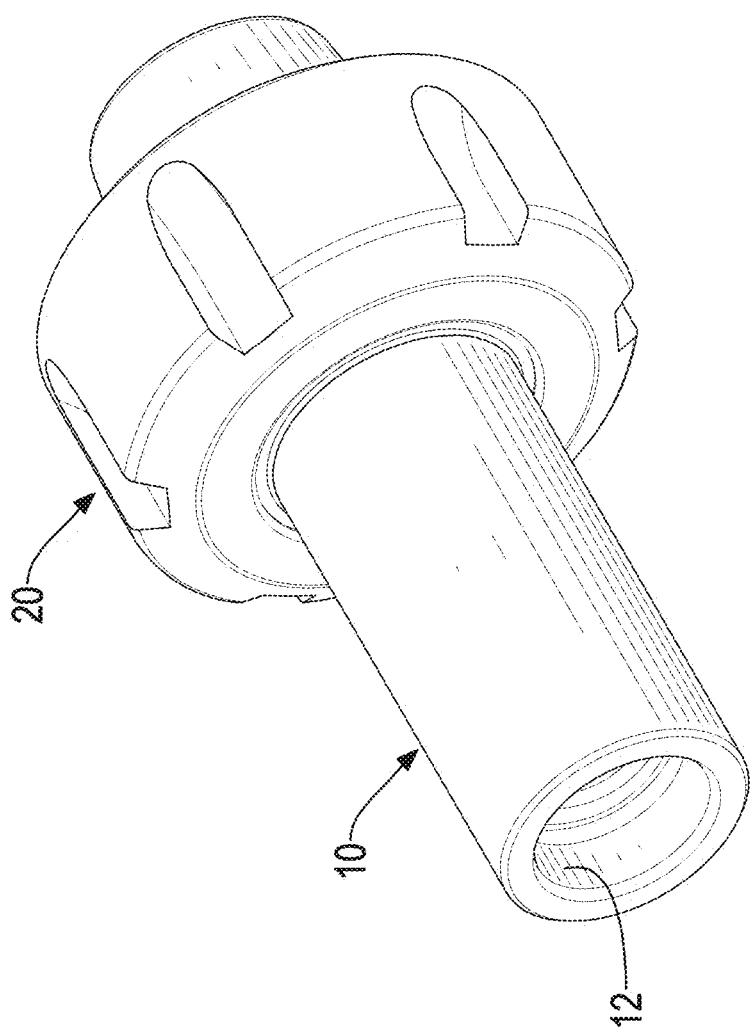
FIG. 1 is a perspective view of a first preferred embodiment of a tool holder assembly easy to assemble and disassemble in accordance with the present invention.
Figure 2:
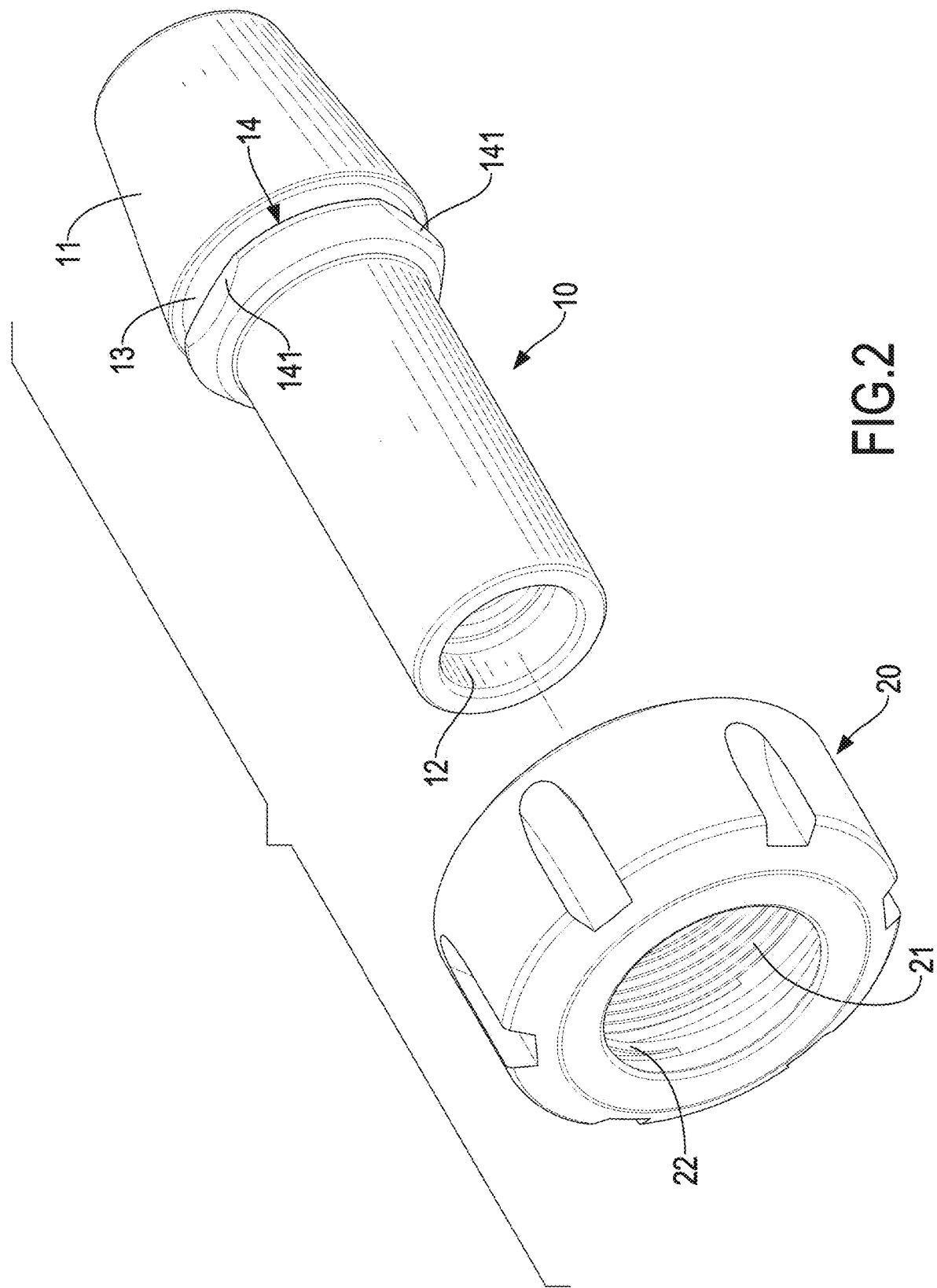
FIG. 2 is an exploded view of the tool holder assembly in FIG. 1.
Figure 3:
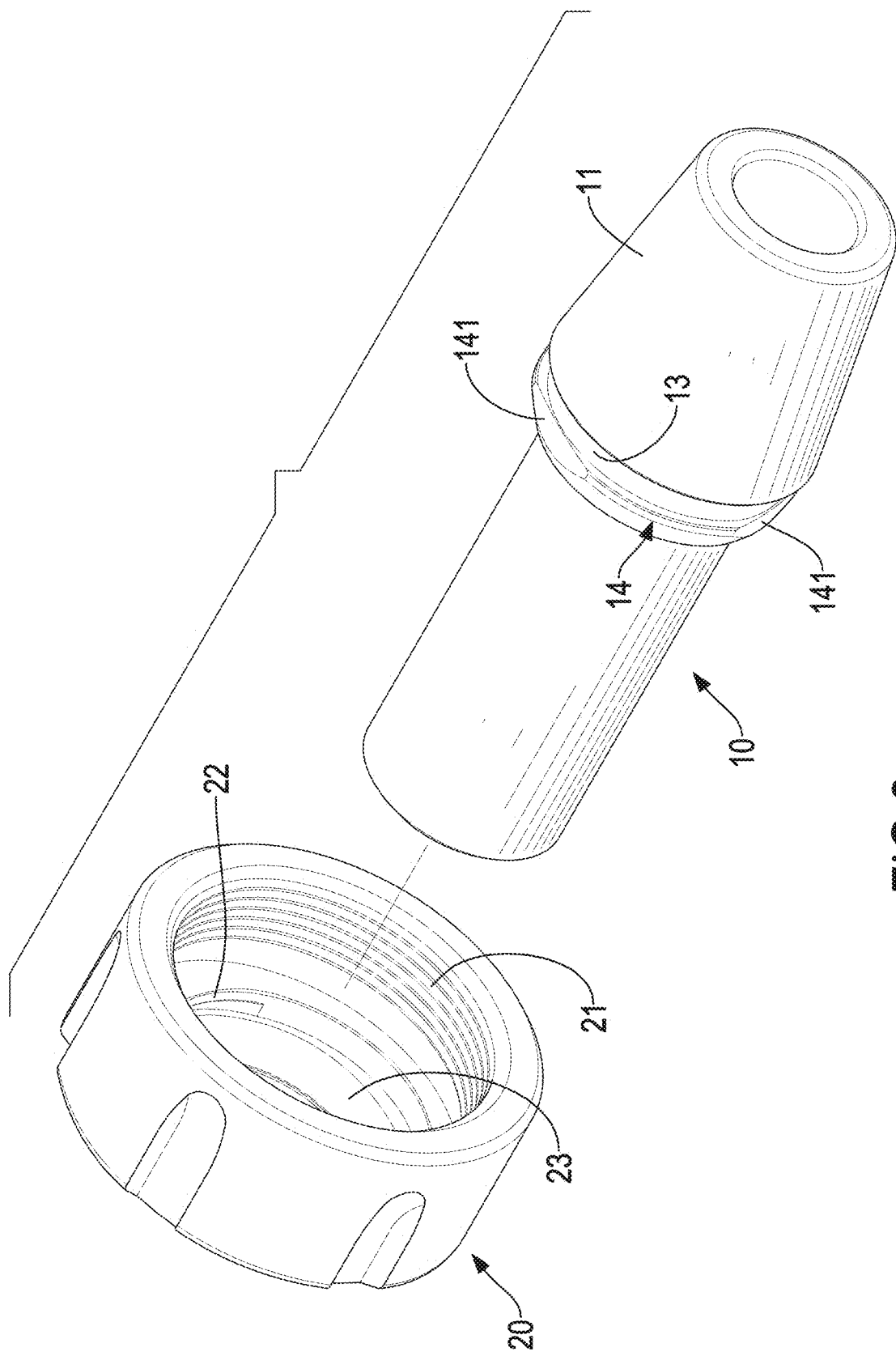
FIG. 3 is an exploded view of the tool holder assembly in FIG. 1 viewed from another angle.

With reference to FIGS. 1 to 3, a first preferred embodiment of a tool holder assembly easy to assemble and disassemble in accordance with the present invention has a chuck 10 and a clamping nut 20. The chuck 10 and the clamping nut 20 are configured to be assembled together and then to be mounted to a holder body so as to assemble a tool holder, wherein the chuck 10 is configured for mounting a tool thereto, and the clamping nut 20 is configured to fix the chuck 10 and the tool onto a holder body.

Figure 4:
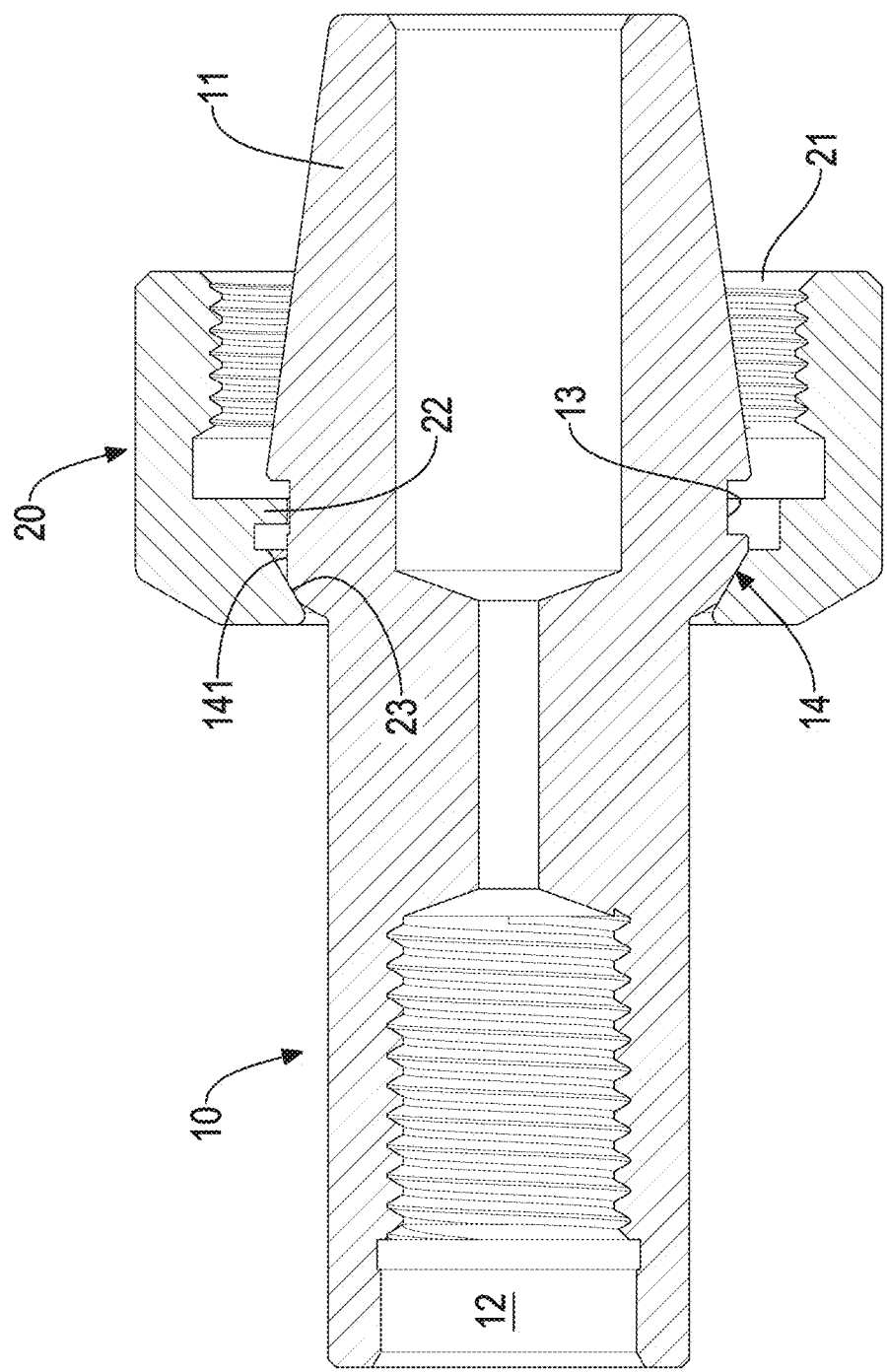
FIG. 4 is a cross-sectional side view of the tool holder assembly in FIG. 1.

With reference to FIGS. 2 to 4, the chuck 10 has a base portion 11, an annular groove 13, a nut positioning portion 14, and three arc surfaces 141. The base portion 11, the annular groove 13, and the nut positioning portion 14 are arranged sequentially along a length direction of the chuck 10, and two opposite sides of the annular groove 13 are respectively connected to the base portion 11 and the nut positioning portion 14. The base portion 11 is configured to be installed to a holder body. The annular groove 13 and the nut positioning portion 14 are configured to prevent the chuck 10 and the clamping nut 20 from detachment after the chuck 10 and the clamping nut 20 are assembled together.

In the first preferred embodiment, the chuck 10 is a high-rigidity chuck without any slot formed on a periphery of the chuck. Moreover, one of two opposite sides of the nut positioning portion 14 is connected to the annular groove 13, and the other one of the two opposite sides of the nut positioning portion 14 extends to form a tubular construction. The tubular construction forms a tool mounting hole 12 therein. With reference to FIG. 4, the tool mounting hole 12 has an internal thread to be threaded with a tool. In other embodiments, the chuck 10 may mount a tool by other conventional means, not limited to the internal thread described above.

Figure 5:
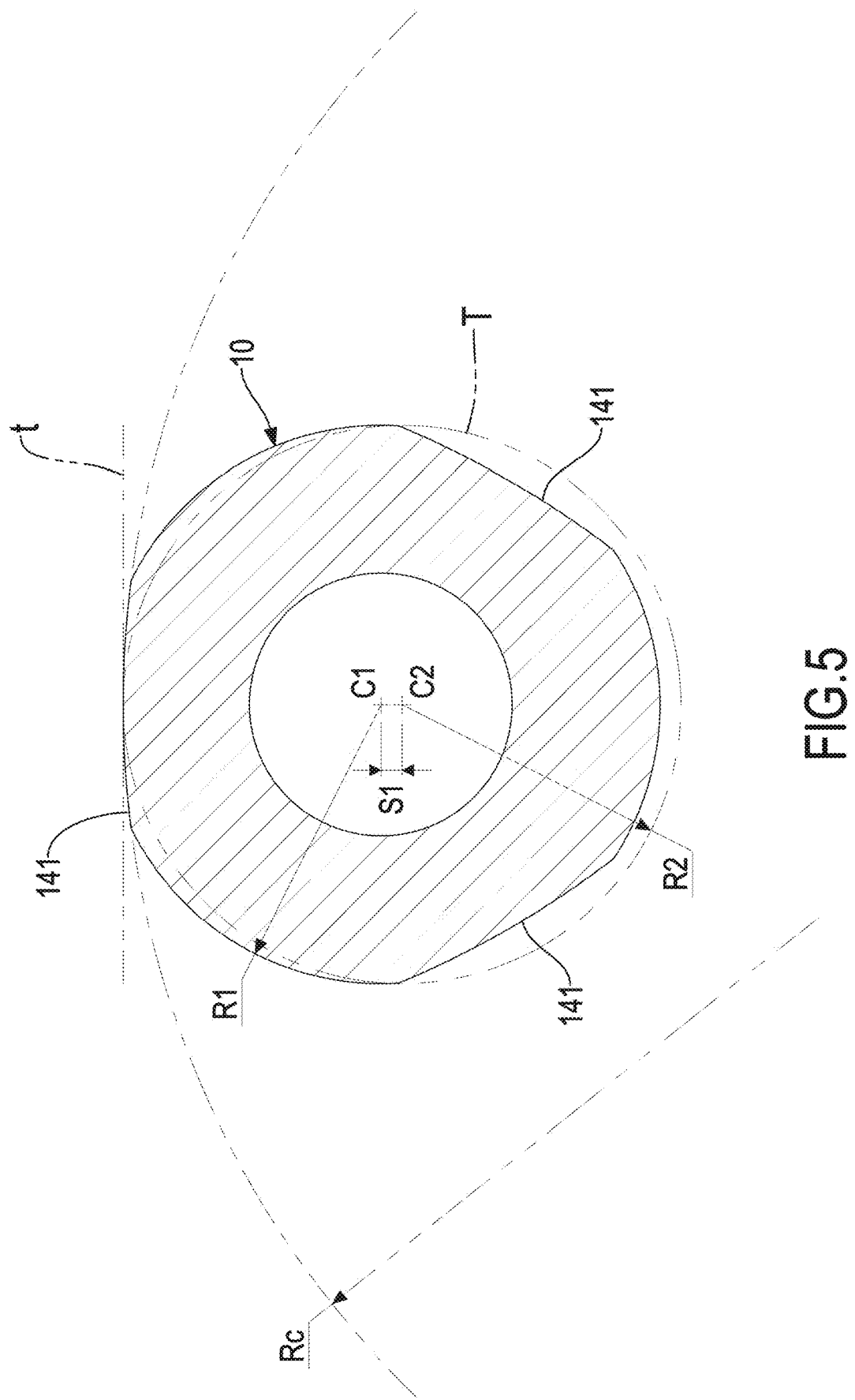
FIG. 5 is a cross-sectional end view of a nut positioning portion of a chuck of the tool holder assembly in FIG. 1.

With reference to FIGS. 2, 3, and 5, each said arc surface 141 is formed on a periphery of the nut positioning portion 14 by cutting. The above-mentioned "cutting" means removing material from a periphery of a workpiece during processing to form said arc surface 141. With reference to FIG. 5, the nut positioning portion 14 has a radius R1, and each one of the three arc surfaces 141 has a radius of curvature Rc. The radius of curvature Rc of each said arc surface 141 is larger than the radius R1 of the nut positioning portion 14.

Specifically, after processing a workpiece to roughly form an outer profile of the nut positioning portion 14, a manufacturer further removes material from the workpiece. The removing process is defined by a removing radius, wherein the removing radius is equal to the radius of curvature Rc of each said arc surface 141. An arc formed and defined by the removing radius passes through the workpiece. After cutting the workpiece along the arc defined by the removing radius, said arc surface 141 having the radius of curvature Rc can be formed on the nut positioning portion 14.

Figure 6:
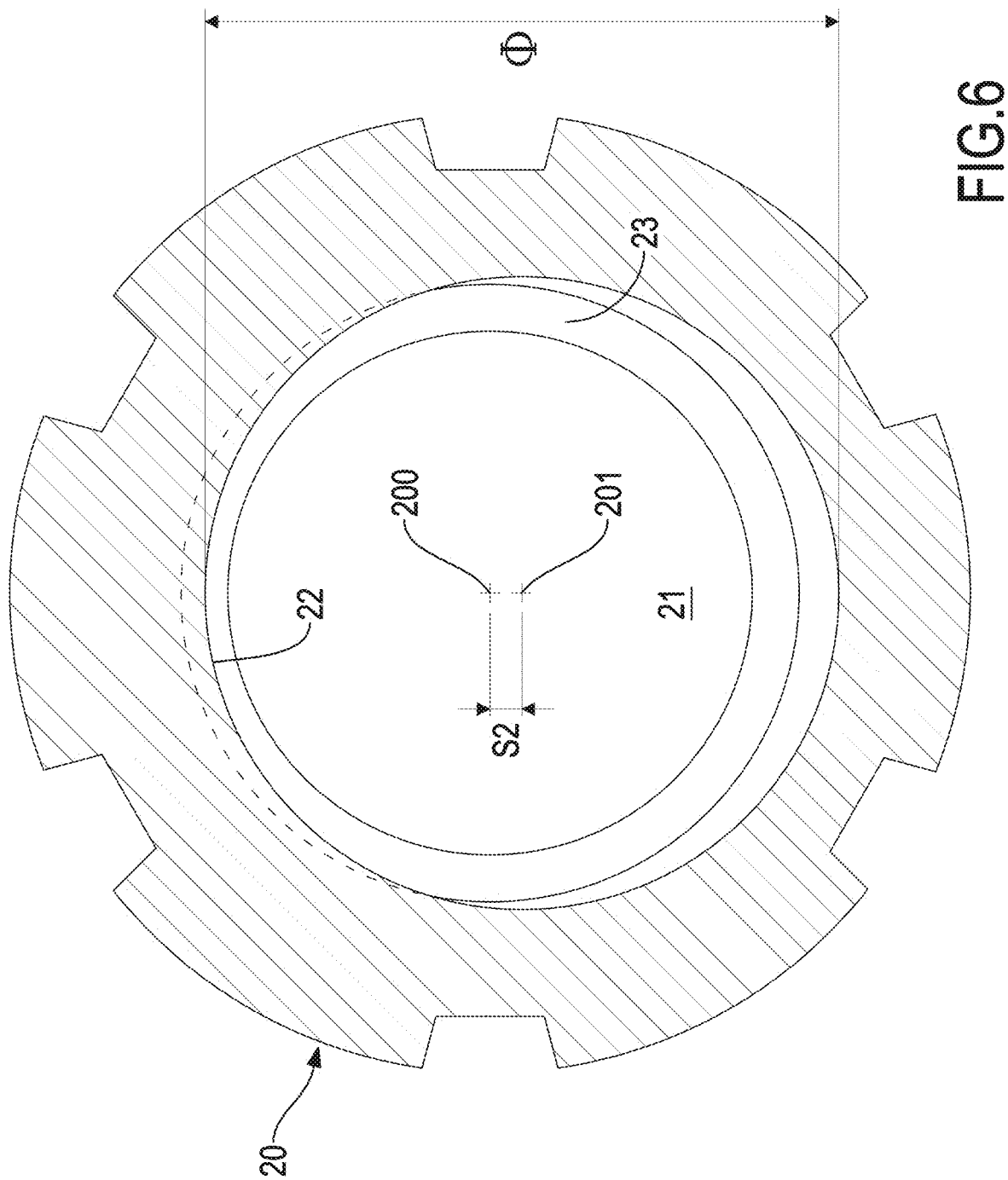
FIG. 6 is a cross-sectional end view of a clamping nut of the tool holder assembly in FIG. 1.

With reference to FIGS. 2, 4, and 6, the clamping nut 20 is hollow and surrounds an interior space 21. The clamping nut 20 has an inner protruding edge 22 protruding from an inner side of the clamping nut 20 toward the interior space 21 to form an eccentric circle in the interior space 21. Specifically, with reference to FIG. 6, the clamping nut 20 has an axis 200, and the eccentric circle formed by the inner protruding edge 22 has a diameter @ and a center 201. The center 201 is spaced from the axis 200 by an eccentric distance S2.

With reference to FIGS. 2 and 3, in the first preferred embodiment, the clamping nut 20 adopts an UM-type ER chuck nut. The UM-type clamping nut has multiple grooves arranged at spaced intervals around its axis and is configured to be rotated by an UM-type wrench having hooks corresponding to the grooves on the UM-type clamping nut. Thereby, the clamping nut 20 can be screwed onto a holder body of a tool holder.

For better assembly, sizes of the nut positioning portion 14 of the chuck 10 and said arc surfaces 141 formed by cutting are designed correspondingly to sizes of the clamping nut 20. Specifically, with reference to FIGS. 5 and 6, the nut positioning portion 14 is configured to define a tangent line t by a vertex of said arc surface 141, and the tangent line t is configured to further define a tangent circle T. The radius R1 of the nut positioning portion 14 is substantially equal to a radius R2 of the tangent circle T, and a center C2 of the tangent circle T is spaced from a center C1 of the nut positioning portion 14 by a shifting distance S1. The shifting distance S1 can be regarded as a decrease of a radial size due to said arc surface 141 formed by cutting. The shifting distance S1 is equal to the eccentric distance S2 of the eccentric circle formed in the interior space 21.

Figure 7:
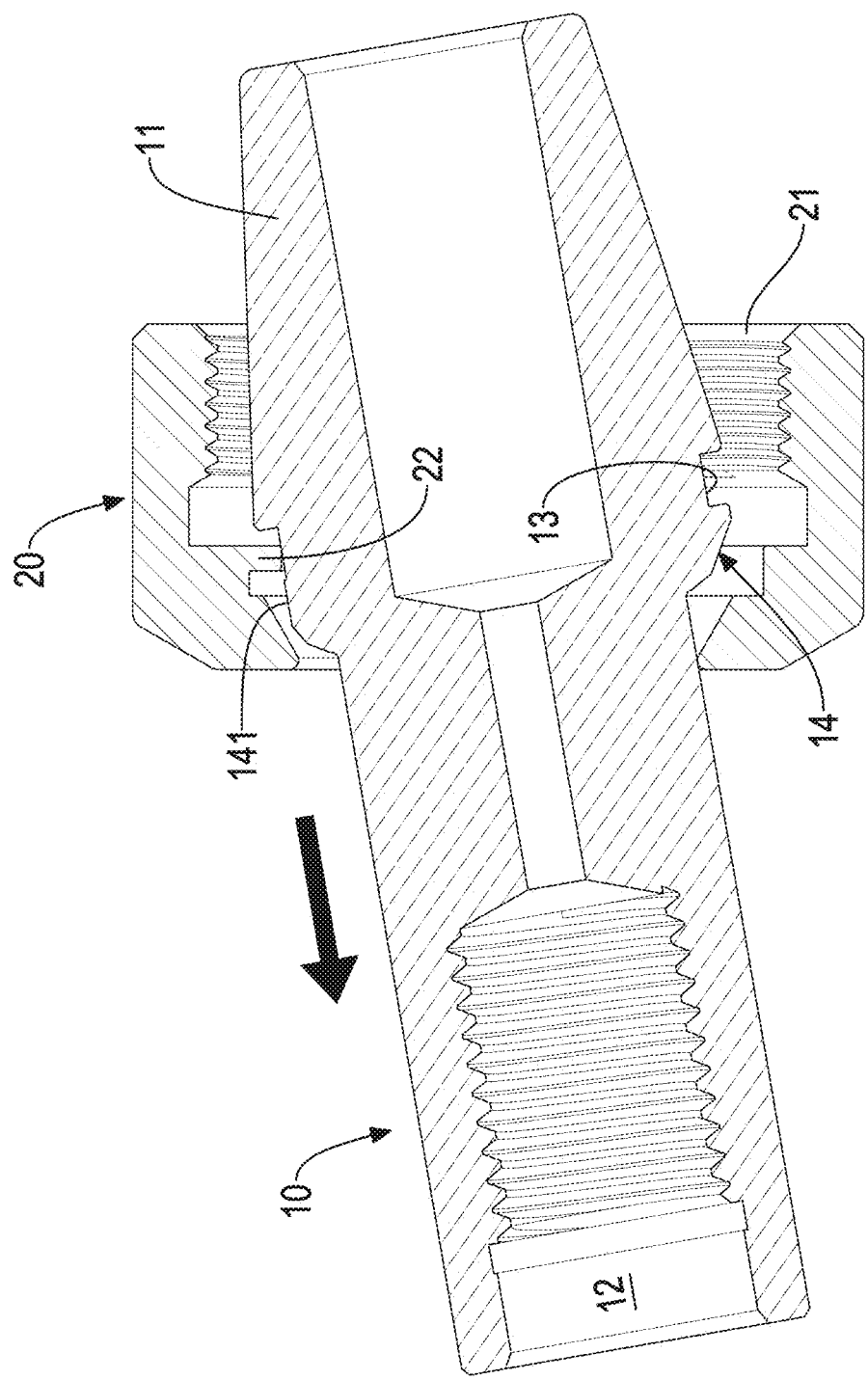
FIGS. 7 to 9 are operational views depicting assembly of the tool holder assembly in FIG. 1.

By the inner protruding edge 22 of the clamping nut 20 and the annular groove 13, the nut positioning portion 14, said arc surfaces 141 of the chuck 10, the convenience of assembling the chuck 10 and the clamping nut 20 can be improved. The details are described below:

To assemble a tool holder applying the tool holder assembly, the chuck 10 and the clamping nut 20 are assembled together first. With reference to FIG. 7, the first step is to mount the chuck 10 through the interior space 21 surrounded by the clamping nut 20. When mounting, by adjusting an angle of the chuck 10, an axis of the chuck 10 and an axis of the clamping nut 20 become inclined to each other, and the nut positioning portion 14 faces toward the inner protruding edge 22 with said arc surface 141. Thereby, the inner protruding edge 22 is configured to pass by said arc surface 141 on the nut positioning portion 14.

Figure 8:
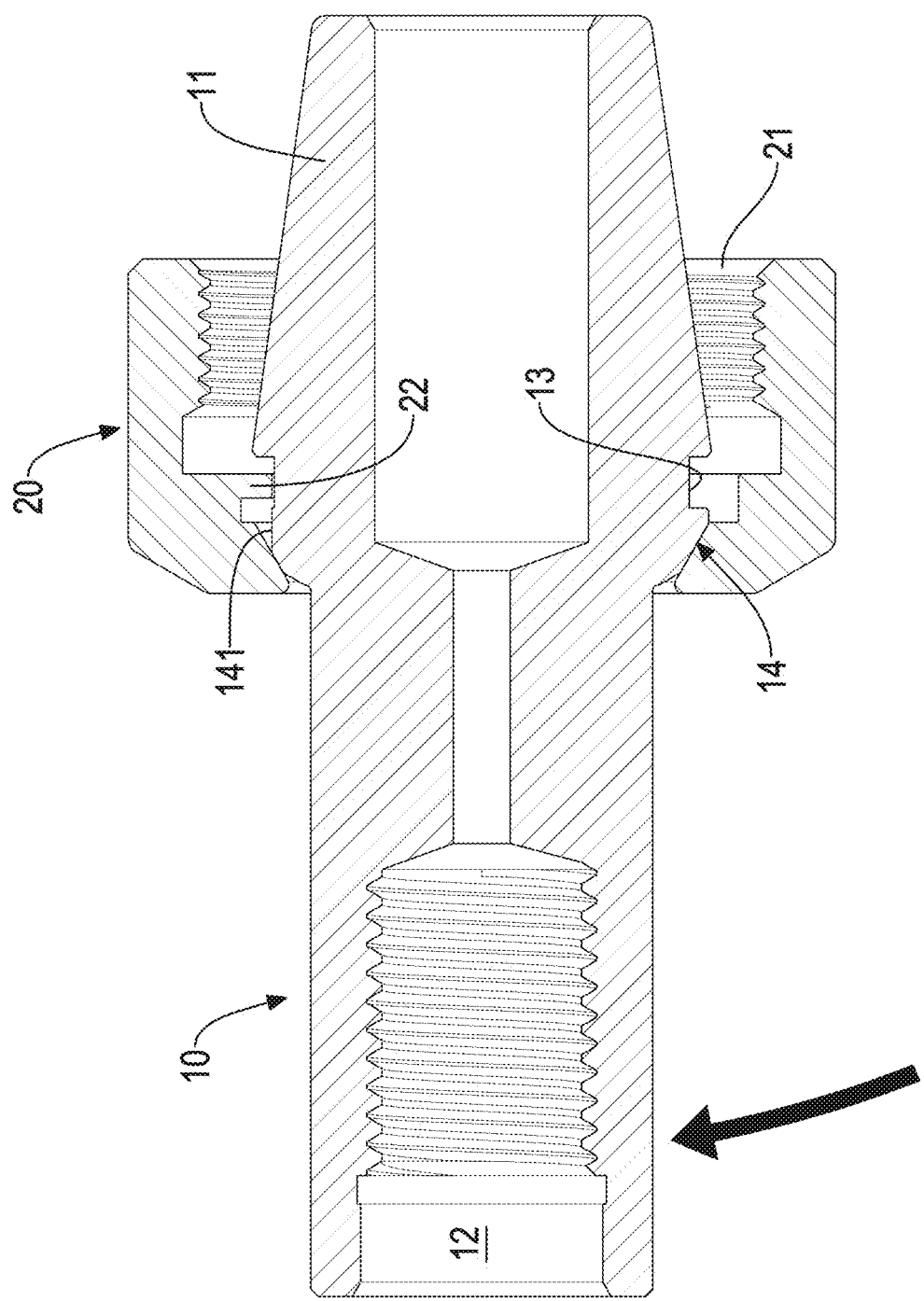
Figure 9:
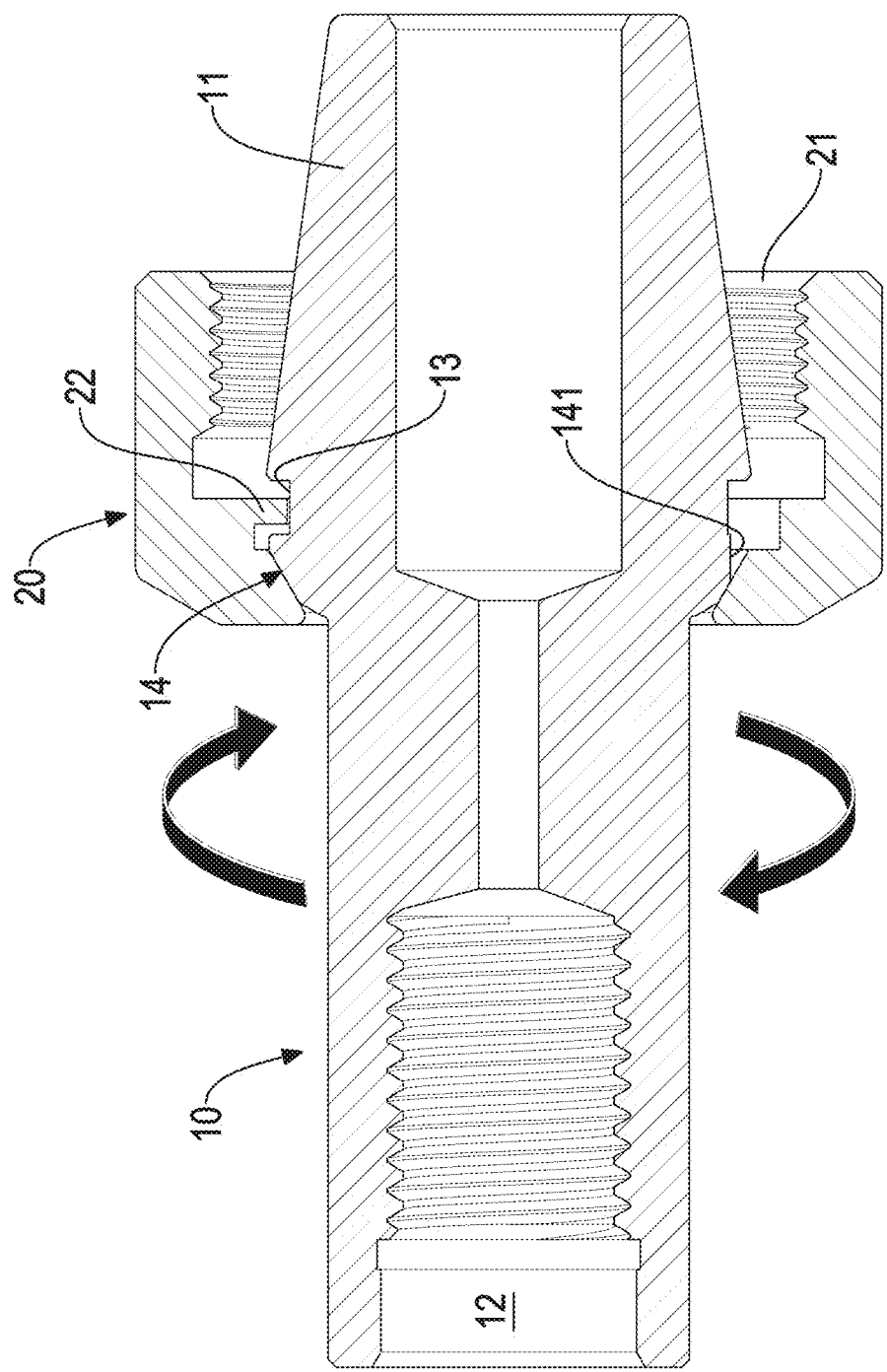

With reference to FIGS. 7 and 8, after passing by said arc surface 141, the inner protruding edge 22 enters the annular groove 13 such that the chuck 10 can be smoothly mounted through the interior space 21. Then, the angle of the chuck can be adjusted again so as to coaxially realign the chuck 10 with the clamping nut 20. Afterwards, the chuck 10 can be rotated around the axis of the chuck 10 after alignment such that the nut positioning portion 14 faces toward the inner protruding edge 22 with a portion other than said arc surfaces 141, and the assembly of the chuck 10 and the clamping nut 20 is finished. At the time, the inner protruding edge 22 is blocked by the nut positioning portion 14 to be engaged in the annular groove 13; the chuck 10 and the clamping nut 20 are less likely to be detached from each other.

Figure 10:
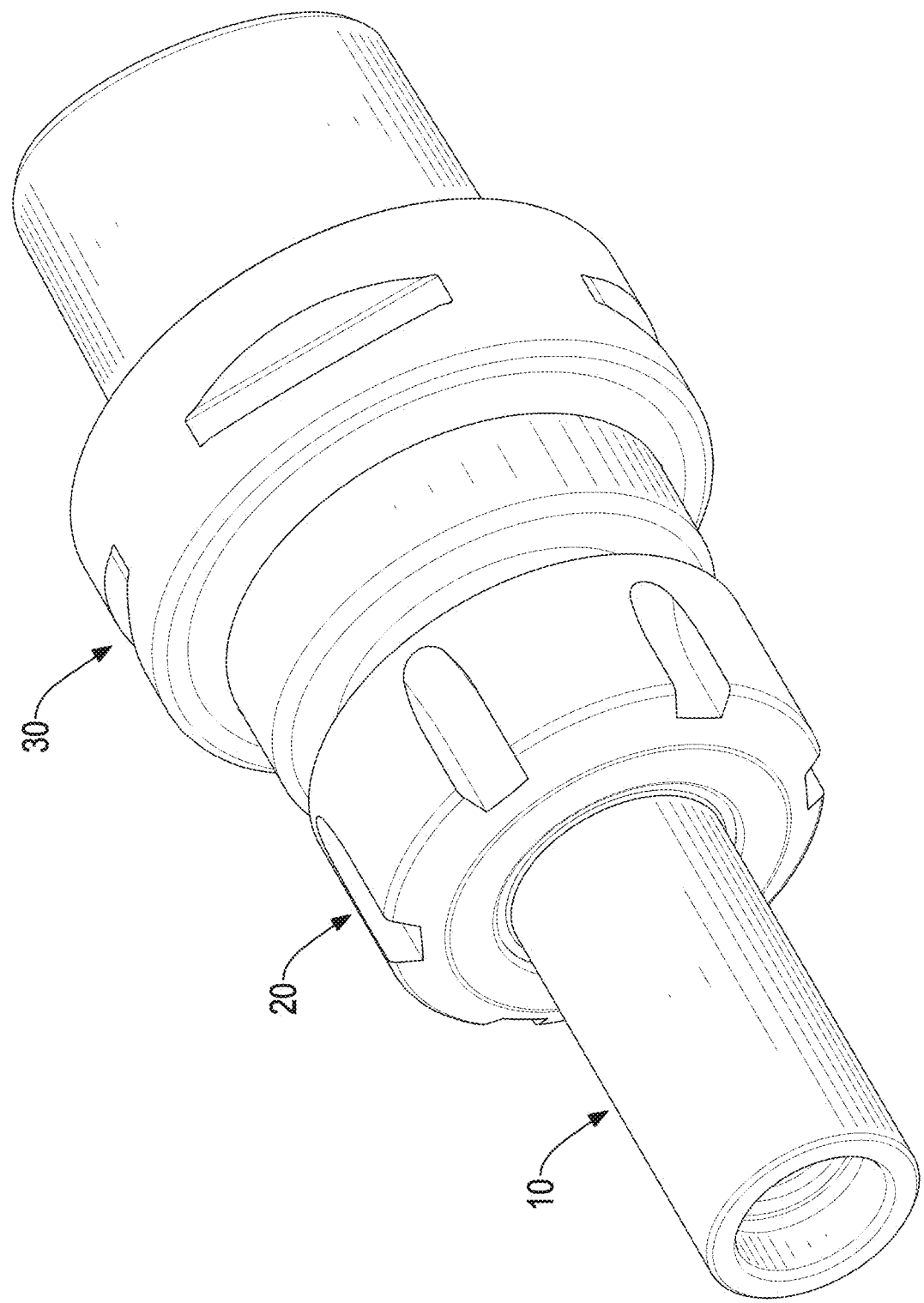
FIG. 10 is a perspective view of the tool holder assembly in FIG. 1 mounted to a holder body.

Finally, with reference to FIG. 10, the chuck 10 and the clamping nut 20 assembled together can be mounted to a holder body 30. By the clamping nut 20 being screwed onto the holder body 30, the chuck 10 can also be fixed to the holder body 30 to finish assembly of a tool holder. Said tool holder may mount a tool via the tool mounting hole 12 and may be held on a spindle of a machine tool along with the tool via the holder body 30 for processing. When trying to detach said tool holder, since the inner protruding edge 22 is engaged in the annular groove 13, when the clamping nut 20 is unscrewed from the holder body 30, the inner protruding edge 22 abuts against the nut positioning portion 14 to allow the chuck 10 to be detached from the holder body 30 along with the clamping nut 20, which improves convenience of disassembly.

With the above-mentioned technical features, the tool holder assembly easy to assemble and disassemble in accordance with the present invention has the following efficacy:

1. With said arc surfaces 141 formed on the nut positioning portion 14 by cutting, when assembling, the inner protruding edge 22 is configured to pass by said arc surfaces 141 for not obstructing the nut positioning portion 14. Thereby, the chuck can be mounted through the interior space 21 surrounded by the clamping nut 20 much more easily.
2. Compared to a flat surface or other uneven structures, when said arc surface 141 contacts constructions on the inner side of the clamping nut 20, it is likely to cause a sliding motion along said arc surface 141. Thereby, the chuck 10 is less likely to be engaged with the constructions on the inner side of the clamping nut 20, thereby reducing chances of the chuck 10 engaged with the clamping nut 20 and needing to be plucked from the clamping nut 20 when mounting the chuck 10 through the clamping nut 20.
3. Said arc surface 141 formed by cutting defines said tangent line t and said tangent circle T to define said shifting distance S1, and said shifting distance S1 is substantially equal to the eccentric distance S2 of the eccentric circle in the interior space 21, which improves matching of the nut positioning portion 14 of the chuck 10 and the clamping nut 20, reduces interference caused by the manufacturing error, and allows the chuck 10 and the clamping nut 20 to be assembled together successfully.

With all the efficacies, compared to the conventional tool holder, the present invention improves convenience and efficiency of assembling the chuck and the clamping nut 20. Plus, the easy-to-disassemble configuration of the inner protruding edge 22, the annular groove 13, and the nut positioning portion 14, the present invention thereby provides the tool holder assembly easy to assemble and disassemble.

Moreover, the diameter @ of the inner protruding edge 22 is equal to twice the radius R1 of the nut positioning portion 14; along with said shifting distance S1 being substantially equal to the eccentric distance S2, sizes of the nut positioning portion 14 of the chuck 10 can be more consistent with that of the clamping nut 20, which further reduces interference caused by the manufacturing error. After manufacturing the chuck 10 and the clamping nut, the chuck 10 can be smoothly mounted through the interior space 21 to be assembled with the clamping nut 20.

Further, with reference to FIG. 5, a ratio of the radius of curvature Rc of said arc surface 141 to the radius R1 of the nut positioning portion 14 is between 6.5 and 7 (6.5≤Rc/R1≤7). With the appropriate radius of curvature Rc, said arc surface 141 has an appropriate radian, which not only reduces chances of the chuck 10 being engaged with the clamping nut 20 as mentioned above but also simplifies process of forming said arc surface 141. E.g., in a specific embodiment, the radius of curvature Rc of said arc surface 141 is 110 millimeters, and the radius R1 of the nut positioning portion 14 is 16.375 millimeters.

Preferably, with reference to FIGS. 2 to 4, in the first preferred embodiment, the clamping nut 20 has an inner conical surface 23 being adjacent to the interior space 21, and the nut positioning portion 14 of the chuck 10 has a conical structure. After the inner protruding edge 22 passes by said arc surface 141, enters the annular groove 13, and then is engaged in the annular groove 13, the nut positioning portion 14 having the conical structure abuts the inner conical surface 23 of the clamping nut 20, which further prevents the chuck 10 and the clamping nut 20 from detachment and improves the stability of assembly.

In the first preferred embodiment, the chuck 10 has the three arc surfaces 141. In other embodiments, a number of said arc surfaces can be decided according to needs, not limited to the first preferred embodiment. In the first preferred embodiment, when adjusting the angle of the chuck 10 before mounting the chuck 10 through the interior space 21, the nut positioning portion 14 can face toward the inner protruding edge 22 with any one of the three arc surfaces 141. Each one of the three arc surfaces 141 allows the inner protruding edge 22 to pass thereby and prevents the inner protruding edge 22 from obstructing the nut positioning portion 14, which further improves the convenience in operation.

Preferably, with reference to FIG. 5, the three arc surfaces 141 are arranged at equiangular intervals such that each adjacent two of the three arc surfaces 141 are spaced from each other, which not only allows any one of the three arc surfaces 141 to face toward the inner protruding edge 22 as mentioned above but also allows the nut positioning portion 14 to have sufficient structure to prevent the inner protruding edge 22 from being easily detached from the annular groove 13.

Figure 11:
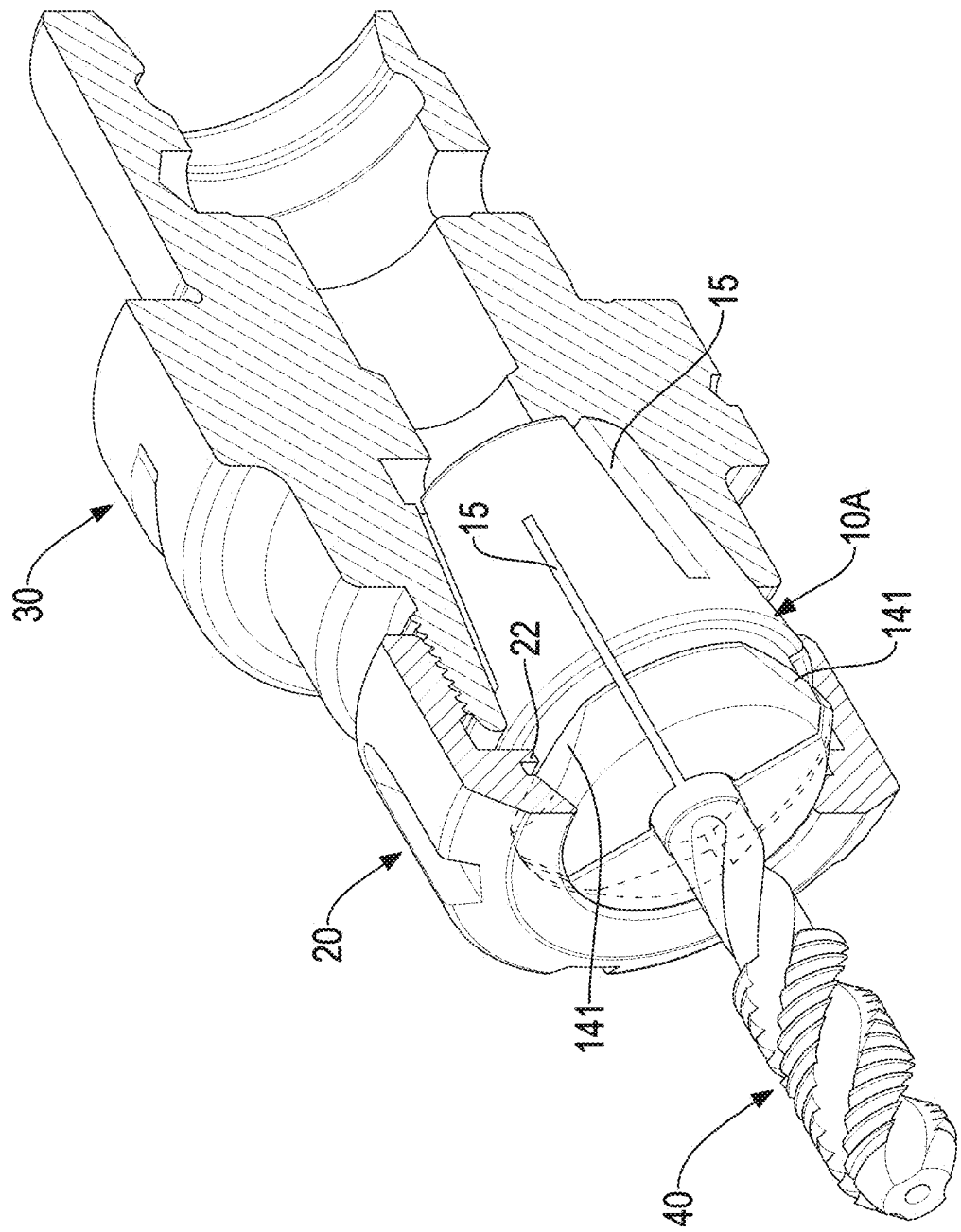
FIG. 11 is a partial sectional view of a second preferred embodiment of the tool holder assembly in accordance with the present invention mounted to the holder body.

With reference to FIG. 11, a second preferred embodiment of the tool holder assembly easy to assemble and disassemble in accordance with the present invention differs from the first preferred embodiment in that: the tool holder assembly adopts another kind of the chuck 10A. Compared to the high-rigidity chuck 10 in the first preferred embodiment, in the second embodiment, the chuck 10A adopts an elastic chuck. Specifically, the chuck 10A has multiple slots 15 formed on its periphery to have elasticity and thereby is configured to deform elastically to tightly hold a tool. A mounting hole for mounting a tool 40 therein extends from the nut positioning portion 14 toward the base portion 11.

Figure 12:
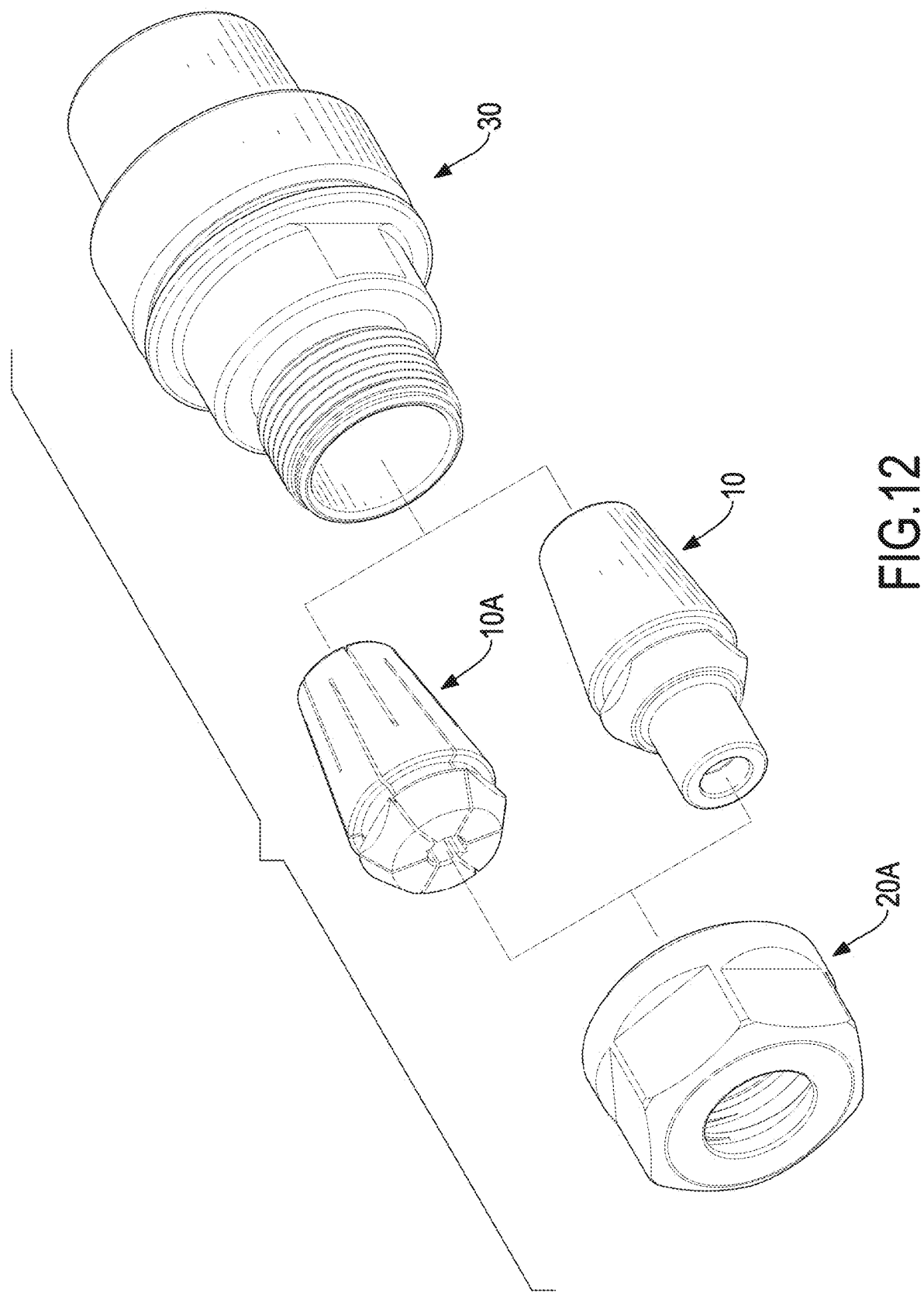
FIG. 12 is an exploded view of a third preferred embodiment of the tool holder assembly in accordance with the present invention mounted to the holder body.

With reference to FIG. 12, a third preferred embodiment of the tool holder assembly easy to assemble and disassemble in accordance with the present invention differs from the first and the second preferred embodiments in that: the tool holder assembly adopts another kind of the clamping nut 20A. Compared to the UM-type clamping nut, in the third preferred embodiment, the clamping nut 20A adopts an A-type clamping nut; i.e., a hex (hexagonal) nut. The clamping nut 20A is screwable by an A-type wrench (i.e., a hex wrench). Additionally, in the third preferred embodiment, the tool holder assembly May adopt one of the chucks 10, 10A in the first preferred embodiment and the second preferred embodiment.

In the second and the third preferred embodiments, the chucks 10, 10A both have the annular groove 13, the nut positioning portion 14, and said arc surfaces 141 formed on the nut positioning portion 14 by cutting, and the clamping nuts 20, 20A both have the inner protruding edge 22 so as to improve the convenience of assembly and disassembly. The present invention may apply different types of chucks 10, 10A or different types of clamping nuts 20, 20A or even be mounted to different types of holder bodies 30, not limited to any specific chuck, clamping nut, or holder body.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tool holder assembly configured to be assembled and disassembled, the tool holder assembly comprising:
   a chuck having
      a base portion;
      a nut positioning portion;
      an annular groove recessed on a periphery of the chuck and having two opposite sides respectively connected to the base portion and to the nut positioning portion; and
      at least one arc surface formed on a periphery of the nut positioning portion by cutting; and
   a clamping nut being hollow, surrounding an interior space, and having
      an inner protruding edge formed on an inner side of the clamping nut to form an eccentric circle having a center spaced from an axis of the clamping nut by an eccentric distance in the interior space;
   wherein the nut positioning portion is configured to define a tangent line by a vertex of said at least one arc surface so as to define a tangent circle;
   the tangent circle is partially overlapped with the nut positioning portion, has a center spaced from a center of the nut positioning portion by a shifting distance being substantially equal to the eccentric distance, and has a radius being substantially equal to a radius of the nut positioning portion;
   when the chuck is being mounted through the interior space, the inner protruding edge is configured to pass by said at least one arc surface, enter the annular groove, be blocked by the nut positioning portion, and be engaged in the annular groove.

2. The tool holder assembly as claimed in claim 1, wherein a diameter of the eccentric circle is equal to twice the radius of the nut positioning portion.

3. The tool holder assembly as claimed in claim 2, wherein a ratio of a radius of curvature of said at least one arc surface to the radius of the nut positioning portion is between 6.5 and 7.

4. The tool holder assembly as claimed in claim 3, wherein the clamping nut has an inner conical surface;
the nut positioning portion has a conical structure; and
when the inner protruding edge is engaged in the annular groove, the nut positioning portion abuts the inner conical surface of the clamping nut.

5. The tool holder assembly as claimed in claim 3, wherein the at least one arc surface comprises multiple said arc surfaces.

6. The tool holder assembly as claimed in claim 5, wherein the multiple arc surfaces are arranged at equiangular intervals.

7. The tool holder assembly as claimed in claim 2, wherein the clamping nut has an inner conical surface;
the nut positioning portion has a conical structure; and
when the inner protruding edge is engaged in the annular groove, the nut positioning portion abuts the inner conical surface of the clamping nut.

8. The tool holder assembly as claimed in claim 1, wherein a ratio of a radius of curvature of said at least one arc surface to the radius of the nut positioning portion is between 6.5 and 7.

9. The tool holder assembly as claimed in claim 3, wherein the clamping nut has an inner conical surface;
the nut positioning portion has a conical structure; and
when the inner protruding edge is engaged in the annular groove, the nut positioning portion abuts the inner conical surface of the clamping nut.

10. The tool holder assembly as claimed in claim 8, wherein the at least one arc surface comprises multiple said arc surfaces.

11. The tool holder assembly as claimed in claim 10, wherein the multiple arc surfaces are arranged at equiangular intervals.

12. The tool holder assembly as claimed in claim 1, wherein the clamping nut has an inner conical surface;
the nut positioning portion has a conical structure; and
when the inner protruding edge is engaged in the annular groove, the nut positioning portion abuts the inner conical surface of the clamping nut.

* * * * *